UNITED STATES PATENT OFFICE.

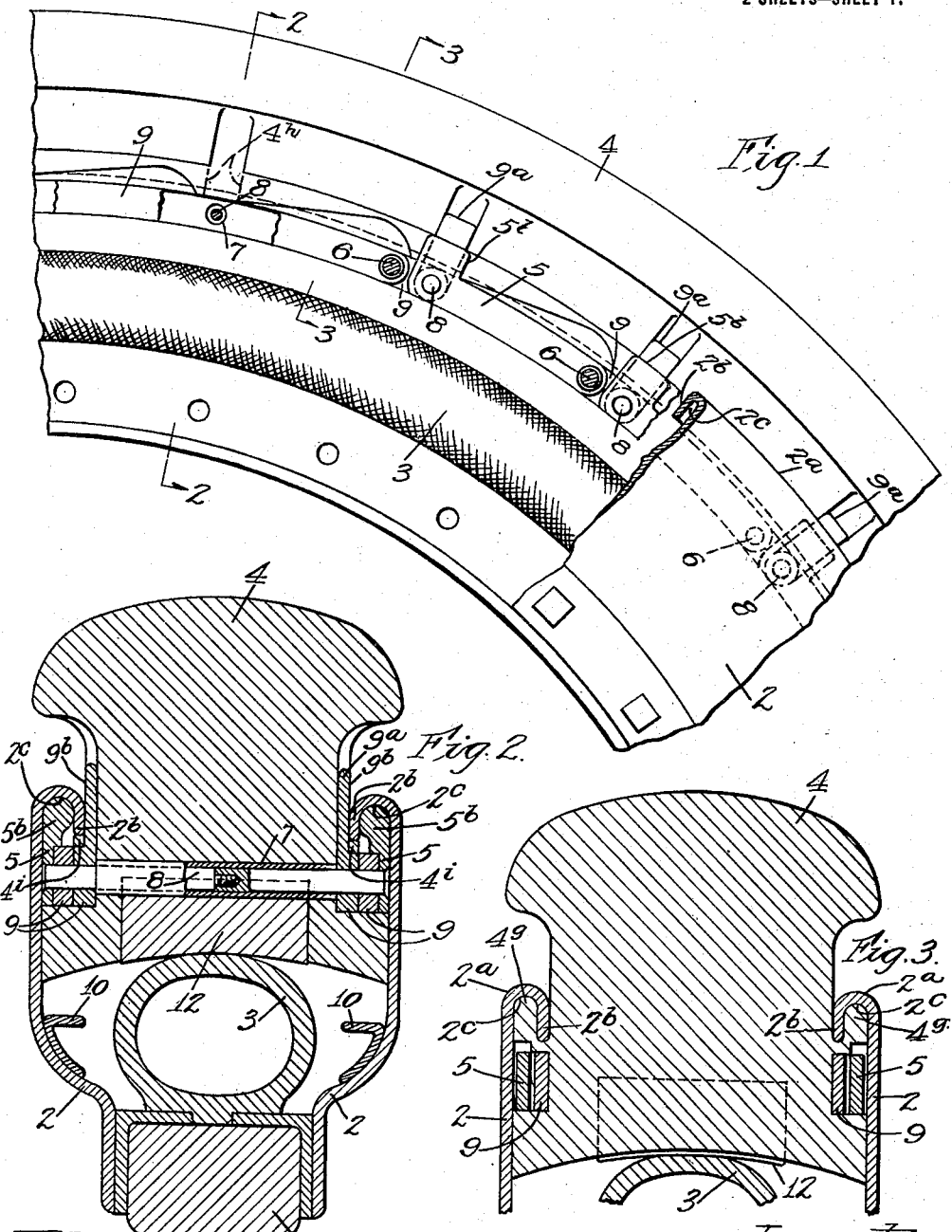

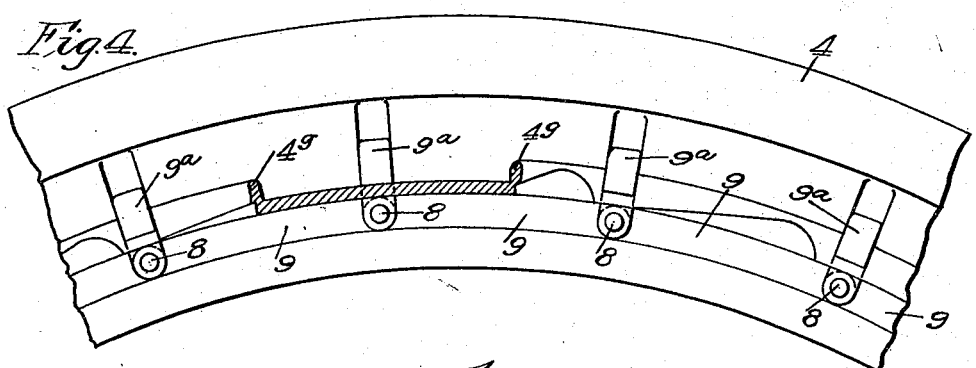
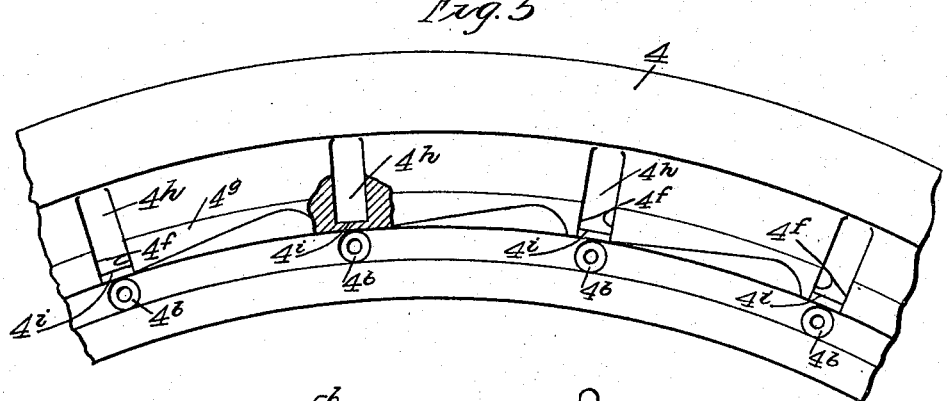
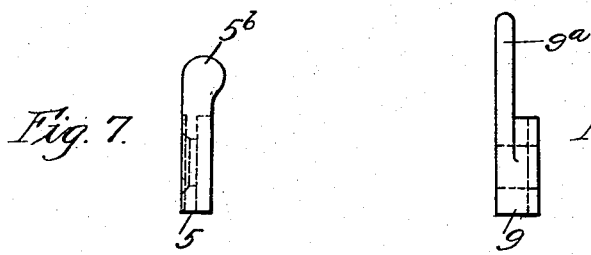
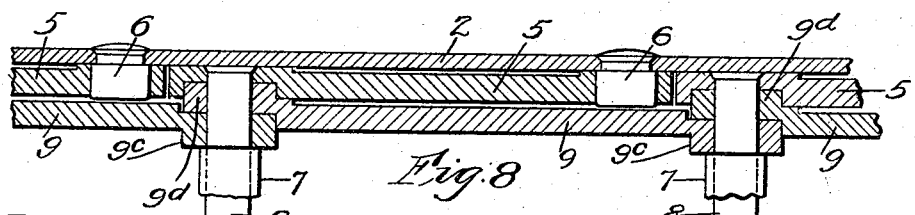

CHARLES S. BURTON, OF OAK PARK, ILLINOIS.

VEHICLE-WHEEL TIRE.

1,217,407.　　　　　Specification of Letters Patent.　　Patented Feb. 27, 1917.

Application filed September 21, 1914.　Serial No. 862,634.

*To all whom it may concern:*

Be it known that I, CHARLES S. BURTON, a citizen of the United States, residing at Oak Park, in the county of Cook and State of Illinois, have invented new and useful Improvements in Vehicle-Wheel Tires, of which the following is a specification, reference being had to the accompanying drawings, forming a part thereof.

The purpose of this invention is to provide an improved construction of a vehicle wheel tire of the character comprising the cushioning tread member and adapted also to comprise a pneumatic air spring interior to the tread member. It consists in the elements and features of construction shown and described as indicated in the claims.

In the drawings:

Figure 1 is a side elevation of a fragment of a wheel and tire embodying this invention, the tire-retaining lateral guard being partly broken away.

Fig. 2 is a section at the line 2, 2, on Fig. 1.

Fig. 3 is a section at the line, 3, 3, on Fig. 1.

Fig. 4 is a side elevation of a segment of the rubber tread member and associated reinforcing and draft-transmitting links, the primary draft link being removed.

Fig. 5 is a side elevation of the rubber tread member with all of the links removed.

Fig. 6 is an end view of one of the draft-transmitting links.

Fig. 7 is an end view of one of the primary draft links.

Fig. 8 is a section of link structure at the curved line, 8, 8, on Fig. 1.

In the tires shown in the drawings above described, there are secured upon the felly, 1, of the wheel, lateral metal guards, 2, 2, forming between them a peripheral channel in which the tire proper is retained and seated. As illustrated in the drawing there is provided an air spring, 3, which is seated in this channel at the bottom thereof, and upon which is seated the cushioning tread member, 4, said tread member being adapted to be seated otherwise in the absence of the air spring, or when the air spring is deflated and thereby prevented from supporting said tread member. The particular manner of securing the lateral guards, 2, 2, to the felly, 1, and the particular structure of the air spring, do not constitute features distinguishing the present invention. Any method of securing the guards to the felly which will render them fixed and rigid in position, and any form of air spring adapted to be seated in the channel between the guards and within the inner circumference of the cushioning tread member, 4, may be appropriately employed. The features of this invention relate to the form of the cushioning tread member and the means for reinforcing it and connecting it with the wheel proper which is effected by connecting it with the lateral guards, 2, 2. The construction of the cushioning tread member, and its associated parts, and its draft connections, with the lateral guards will now be described.

The cushioning tread member, 4, is preferably made substantially all of rubber or other similar resilient and flexible substance. It is dimensioned to occupy substantially the entire space between the opposite lateral guards, 2, 2, outside of the space allotted to the air spring, and particularly it is designed and dimensioned to entirely occupy and close the peripheral gap between the outer circumferences of the opposite side guards and is parallel-sided at the portion which enters between the peripheries of the side guards so that it may reciprocate radially with respect to the wheel between the side guards, as into the air spring which supports it yields radially under the load. For the purpose of transmitting rotary movement between the tread member and the rigid parts of the wheel, including the side guards, 2, 2,—that is, transmitting said rotary motion from the side guards to the tread member, when the wheels are the driving or traction wheels, and transmitting rotary motion from the tread member to the lateral guards and remainder of the wheel when the wheels are trailers or steering wheels,—that is, other than driving wheels,—there are provided draft links, which to distinguish them from other links in the structure to be described, are herein termed the primary draft links, 5, said primary draft links being pivoted at one end to one of the lateral guards, 2, 2, and at the other end to the tread member. Preferably at the normal position, that is, at the position occupied when the tread member is not compressed or forced inward radially with respect to the lateral guards, these draft links extend in directions approximately tangential to the circle in which their pivots to the lateral guards are located, so that in transmitting the rotary motion or draft, either from the lateral guards to the tread member or from the tread member to the lateral guards, the links extend at right angles to radii of the wheel through their respective pivots to the lateral guards. For pivoting these primary draft links to the lateral guards, 2, 2, the latter are furnished with rigid pivot studs, 6, projecting inwardly from the said lateral guards; and for pivoting the primary draft links,—to the tread member, there are preferably embedded in the tread member, extending transversely therethrough metal sleeves, 7, into which the pivot studs or spindles, 8, of the tread-member-end of the links, 5, are inserted, so that said embedded metal sleeves constitute journal bearings for the link pivots in the tread member.

Preferably the primary draft links, besides transmitting the rotary movement from one to the other of the two members which they connect, are adapted to serve the purpose of limiting the radially outward movement of the tread member between the lateral guards. For this purpose the lateral guards have their outer circumferential marginal portion turned laterally inward so as to overhang the lateral portion of the channel between the two guards, and the draft links being pivoted closely adjacent to the inner surface of the lateral guard, are situated in the portion of said channel which is thus overhung by the in-turned flanges of the guard, and the ends of the draft links which are pivoted to the tread member are thereby positioned so that in the outward movement of the tread member, they are forced up against said overhanging flanges, and stopped against further outward movement and thereby stop the tread member. It will be understood that when an air spring is comprised in the tire as illustrated, the inflation of this air spring operates to force the tread member, 4, radially outward which will seat the primary draft links, 5, as snugly up against the overhanging flanges as the draft transmitting links will permit. For another purpose about to be stated, the laterally in-turned flanges of the lateral guards are in-turned radially, that is, toward the wheel axle forming a lip, $2^b$, and forming a groove or channel, between two different sides of the flange indicated by the reference letter, $2^c$. For convenience the entire laterally inturned flange comprising the lip, $2^b$, is denoted by the reference character, $2^a$. The particular purpose of forming the in-turned lip, $2^b$, and thereby the groove, $2^c$, of the lateral guard, is to afford means for tying the two lateral guards together so that any side stresses or pulls to which they may be subjected, each may sustain the other. Such sideward pulls result in travel when the projecting portion of the tread member is crowded laterally which is caused in travel by obstructions in the road or by irregular ruts with which it may be engaged, or when the vehicle is traveling upon a side hill; and it is obviously important that the lateral guards do not become permanently spread apart by these recurring lateral stresses operating through the tread member. For this purpose the primary draft links, 5, are each formed with a flange, or lug, $5^b$, positioned opposite the pivot of the link which engages the tread member, and extending any distance desired thence toward the other end; and the two opposite draft links have their pivots consisting of those spindles, either formed in one piece or connected together within the embedded metal sleeve which forms their journal bearing in the tread member. When thus connected it will be seen that the lugs, $5^b$, upon the opposite links engaged with the lips of the opposite lateral guards and connected directly through the tread member, 5, by the united spindles, constitute complete ties from lateral guard to lateral guard operating to prevent the guards from being spread apart. It will be also clear that when the connection between the two pins or spindles of the primary draft link is such as shown, that is, adapted to prevent the links from being pushed toward each other, as well as to prevent them being pulled apart,—the same connection described, not only operates to prevent the spreading apart of the lateral guards by a pull,—that is, a pulling action operating upon either of them,—but will also operate to prevent them from being crowded together by exterior pushing upon either of them, and so prevent them from pinching the tread member between them. A convenient means of connecting the pivot spindles of the draft links within the embedded metal sleeves is to provide them in mutually engaging threaded ends so that one may be screwed to the other. When this form of construction is adopted, it will be understood that the entire assemblage of the metal parts (comprising the draft links, and the draft transmitting links hereinafter described) for both sides of the tread member will be completely organized and lodged in the mold in which the tread member is vulcanized; and it will be seen that this avoids the obvious difficulty which would arise in connecting together the two opposite draft link spindles by screwing as described, if the links were to be mounted on the tread member in the manner described after the tread member was vulcanized. The primary draft links are preferably secured rigidly to their spindles or pivots at the ends which are pivoted to the tread member by being driven tight onto the ends of the spindles, which are slightly reduced to form stop shoulders which increase the rigidity of the junction obtained by thus driving the link onto said reduced end. When this method of connection is employed the spindles of the two opposite links may consist of one piece of rod, extending through the tread member up and through the embedded beveled sleeves therein; and with this construction it is equally convenient to form and vulcanize the tread member with only the metal sleeves embedded therein and to apply the remaining metal fittings, the primary draft links and the draft transmitting links hereinafter described, after the tread member is completed and vulcanized. It will be noticed that the stoppage of the draft links against the laterally inturned flange of the lateral guard, as mentioned above, occurs where the end of the lug, 5$^b$, encounters the bottom of the groove, 2$^c$.

Preferably in addition to the two sets of draft links described situated one at each side of the tread member, there is provided at each side of the tread member an endless chain of draft-transmitting links, 9, whose pivots are the pivot spindles, 8, of the primary draft links. These draft-transmitting chains are preferably partially embedded in the lateral faces of the tread member. They are, however, stopped against lateral movement inward with respect to the tread member, and so are prevented from causing transverse compression of the tread member, by the embedded metal sleeves, 7, against whose ends the inner-lapped ends of the links at each junction throughout the chain, abut.

In order to provide a wearing plate to take the friction of the in-turned flange or lip of the lateral guards against the lateral face of the tread member, the boss, 9$^a$, which constitutes an extension inward of the inner-lodged end of each draft-transmitting link, is extended outward radially with respect to the wheel, as a wearing plate, 9$^b$, and lodged in a correspondingly extended pocket in the side of the tread member, and stands exposed flush with the lateral face of the tread member for a distance equal to the full stroke or play of the tread member between the flanges under the load, that is, so as to cover the entire distance over which the in-turned lip or flange of the lateral guard might otherwise rub upon the lateral face of the tread member. As illustrated, there are eighteen draft links at each side and eighteen draft-transmitting links, 9, so that there are provided in the above described construction eighteen wearing plates to take the rubbing friction of the in-turned flange of the metal guards at each side.

To reduce as much as possible the friction between the draft links and the inner surface of the lateral guards, the draft links are slightly cut back at their outer surfaces throughout their length except as to the end bosses about their pivots, thus reducing the frictional area to the area of said bosses. The construction above described involving the outwardly projecting bosses about the pivot of the outer lapped end of the draft-transmitting link, results in leaving a space for clearance between the outer surfaces of said draft-transmitting links and the inner surfaces of the primary draft links throughout the whole length of said primary draft links except so much at one end as abuts upon said outwardly projecting boss. This clearance besides avoiding friction between the primary draft links and the draft transmitting links is a convenience, in that it permits the extension of the pivot studs, 6, by which the draft links are engaged with the lateral guards, that is, it permits that the pivot studs should be longer than the thickness of the draft links which are engaged with them to the extent, or nearly the extent, of the clearance mentioned, so that the studs project through the links into said space. This is a convenience in assembling the parts of the wheel, because it makes it possible to engage the draft links with their respective pivot studs and one at a time and before the lateral guard is forced fully into place against the tread member, whereas if said studs did not protrude farther than the thickness of the draft links, it would be necessary to get accurate registration of all the studs and all the draft links so that they might all enter at once, before forcing the lateral guard home, which would be very difficult to accomplish.

Preferably, the zone or annular area occupied at each side of the tread member by the link systems described, is situated a short distance radially inward with respect to the inner circumferential edge of the in-turned lip 2$^b$, of the lateral guard, so as to permit the tread member to be formed with its rubber substance extending past that lip and out into the groove, 2$^c$, forming the lip, 4$^g$, which is circumferentially interrupted only by the lugs, 5$^b$. Such occupancy of the groove, 2$^c$, at the inner side is desirable in order to prevent the access thereto of water, and particularly sand, which if it obtains easy entrance, might become gradually packed in the groove and prevent the lugs, 5$^b$, from being thrust out into it as contemplated. Such positioning of the zone occupied by the link system, and extending the rubber as mentioned out past the edge lip, 2$^b$, results in forming an annular neck of rubber, 4$^i$, as thick in the direction of the wheel radius as the "short distance" above mentioned, and as wide as the thickness of the lip, $2^b$, (see Figs. 2 and 3), and, projecting radially out from the outer edge of that neck, segments of flanges whose circumferential extent covers the intervals in the groove, $2^c$, between the lugs, $5^b$. This is desirable in order to prevent the space in the groove becoming filled with water, and particularly with sand, which might become gradually packed in the groove and prevent the lugs, $5^b$, from being thrust out into it as contemplated. This results in an annular neck of rubber, $4^f$, as thick in the direction of the wheel radius as the "short distance" above mentioned, and as wide as the thickness of the lip, $2^b$, and, projecting radially out from the outer edge of that neck, segmental flanges, $4^g$, which fill the intervals in the groove, $2^c$, between the lugs, $5^b$. It will be observed also that the wearing plate extensions, $9^b$, of the link, 9, lie in behind this annular neck, $4^f$, whose continuity with the body of the tread member is necessarily interrupted where the pocket which accommodates the wearing plate extension crosses the annular neck. These interruptions, $4^h$, occurring directly opposite the intervals between the segmental flanges, $4^g$, reduce the neck at that point, that is for about an inch circumferentially of the wheel at each occurrence, to a slender bridge of rubber $4^i$, about one-eighth of an inch square in cross section, which however serves the purpose of completing the closure which the neck is intended to make around the inner edge of the lip, $2^b$, to exclude water and sand or to occupy space which would otherwise tend to become filled with sand.

As the draft links swing at their ends which are pivoted on the spindles, 8, inward toward the wheel center when the load forces the tread member into it, their opposite ends being pivoted to the lateral guards and thus held without capacity for yielding inward, the resulting deflection of said draft links from the circle in which they normally stand necessitates affording space for such deflection by means of recesses, $4^k$, in the sides of the tread member, as shown in Figs. 4 and 5.

The most convenient method of assembling the wheel is as follows:

The inner lateral guard is first securely mounted upon the felly and the air spring, if one is to be employed, is placed in position. The tread member with all the metal elements described, that is all the link systems mounted upon it, is now passed into position against the inner lateral guard, the pivot studs, 6, on the latter, being engaged with the draft links on the inner side of the tread member, the projections, $5^b$, on the draft links throughout the greater portion of the tread member being engaged with the groove, $2^c$, in the peripheral flange of said member by the easy expedient of springing the tread member, the last few of said projections being forced into engagement by using a mallet pounding radially upon the tread member while it is pressed laterally toward the lateral guard, until all of said projections have been sprung into place.

Certain details of the construction of these links remain to be noticed, being preferential only and of minor importance, but not negligible.

In order to obtain adequate bearing of the draft-transmitting links upon the pivot spindles of the primary draft links, without making said draft-transmitting links thicker throughout their length, and so heavier, than necessary for their purpose, the innerlapped end of each of said transmitting links is formed with a lateral inwardly-protruding boss, $9^c$, around the pivot, which is seated in a pocket, $4^b$, provided for it in the lateral face of the tread member 4. For similar purpose the outer-lapped end of each transmitting link has an outwardly protruding boss, $9^d$, to accommodate which the hub of the primary draft link is recessed at the inner side. By these means each end of each of the draft-transmitting links obtains bearing on the pivot spindle, 8, about twice as wide as the thickness of the link at the remainder of its length between said bosses.

Upon considering the structure above described, it will be understood that the draft link, 5, constitutes means by which the rotary impulse may be communicated from the rigid portions of the wheel to the flexible and more or less stretchable and compressible tread member, by substantially simultaneous engagement of the tread member at a multiplicity of points about its circumference instead of at a single point, thus to a large extent eliminating the circumferential extension and compression of the tread member in the traction, and thereby making the tread member much more promptly responsive to the rotary impulse, and reducing the waste of energy which tends to result from such compressibility and extensibility of an elastic tread member. In order, however, to make this draft link organization most fully effective, it is desirable to eliminate the stretching and compressing action which is liable to occur in transmitting the draft in the tread member from each pivotal connection of the draft link therewith to the next such connection. It is for this purpose that the draft transmitting links constituting an endless chain upon each side of the tread member are provided in addition to the primary draft links.

Upon consideration of these endless chains of draft transmitting links at each side of the tread member, it will be understood that if they were proportioned so that each complete endless chain of said links when positioned in circular form, would be of such diameter, that the ends of the lugs, $5^b$, of the draft links, projecting from the pivots of the links of the chains with the same effect substantially as if they projected from the hubs of the links, 9, to the bottom of the groove, $2^c$, of the lateral guard member, such endless chain would have substantially the effect of a rigid annular member engaged with the tread member, and would entirely defeat the flexibility of said tread member, because no one junction or pivotal connection of such endless chain could be forced radially inward without forcing outward one or more other pivotal junctions, and since such outward movement would be prevented by the stoppage of the lugs, $5^b$, at the bottom of the groove, $2^c$, of the lateral guard, inward movement would be prevented, so that no movement would be possible. In order, therefore, that the endless chain of draft-transmitting links shall not defeat the flexibility of the tread member, the parts are so proportioned that when the pivots of the endless chains, which are the pivots of the draft links in the tread member, lie in a circle, a circle which would circumscribe the outer ends of the lugs, $5^b$, is of enough less diameter than that of the lateral guard to the bottom of the groove, $2^c$, to permit the flattening of that circle, by flexure at one or more of the joints of the endless chain, to substantially the extent necessary to permit the tread member to yield inward radially with respect to the wheel to the extent to which the air spring is adapted to be flattened under the load. In the construction shown this distance is designed to be about $\frac{3}{8}$ths of an inch in a wheel having its tread diameter 36″.

Upon further consideration, it will be seen that with the endless chain construction described, having the links arranged for the endless chains before the links are stopped by the in-turned lip of the lateral guards, it will result that when the load is such as to force the tread member inward until the maximum flattening of the endless chains is caused, the endless chains thus flattened at one point in their circumference at which the load operates, will have the effect of a rigid means of transmitting the load to the rigid metal lateral guards, 2, 2, and that no further inward movement of the tread member can occur except from the breaking or bending of one or more of the links or of their pivots. These links and their pivots are designed to be sufficiently strong to carry the load under such conditions. They therefore operate as the means of limiting the compression which can be imposed upon the air spring. In case the air spring is deflated and does not operate as a spring, the tread member will be forced inward by the load to the limit permitted by the endless chains composed of the draft-transmitting links, as indicated, that is, flattening the chains at the lower side of the wheel where the load operates, and bringing the remainder of the circumference of the endless chains into contact with the in-turned lips of the lateral guards.

The same limitation of flattening by limitation of bulging, and substantial rigidity if the chains were not allowed space for slightly bulging elsewhere when flattened at one part of the circumference, would result from the links of the endless chain being stopped by the inner circumference of the in-turned lip, $2^b$, if the annular neck of compressible rubber, $3^f$, were not present; that is, if the in-turned lip were extended through the space occupied by that neck; and the presence of that neck for the purpose stated is the reason for relying on the encounter of the lug, $5^b$, with the bottom of the groove, $2^c$, for the desired limitation of flattening. With the construction shown, these lugs being relied upon for the function described, the rubber neck, $3^f$, may completely and snugly occupy the entire annular interval which is left between the outer circumference of the chain of links, 9, and the inner circumferential edge of the lip, $5^b$; because the compressibility of the rubber will adequately accommodate the necessary amount of flattening and bulging of the chains as described, to permit a $\frac{3}{8}$th″ radial movement of the tread member at the point at which it is under the load.

When operating as above described without the air spring or with it deflated, it will be seen that the tire operates in all respects substantially as a pure cushion tire with the benefit of a cushion whose depth or thickness is to be measured from the circle in which the metal sleeves, 7, are situated, outward to the tread circumference. In order to obtain the advantage of the remainder of the thickness of the rubber tread member,—that is, the portion from the sleeves, 7, inward to the inner circumference of said tread member, it is preferred to rivet onto the inner sides of the lateral guards supporting ledges, 10, 10, which are reached by the inner circumference of the tread member at the sides when it is forced inward by the load, before the limit of flattening of the chain consisting of the draft-transmitting links is reached, and enough before that limit is reached to accommodate the full amount of compression of which the portion of the tread member between the inner circumference and the circle in which the embedded metal sleeves, 7, are situated is safely susceptible. By this means the full cushioning value of the tread member from inner to outer circumference is made available before the load is transmitted positively by the endless chains composed of draft-transmitting links to the rigid lateral guards, 2, 2, and before, therefore, the duty of carrying the load is imposed upon the links and their pivots.

In accordance with a practice approved by experience and not in itself constituting a part of the present invention, except in combination with other features above described, there are embedded in the inner circumference of the tread member, 4, wooden blocks, 12, preferably paraffin-treated for filling the grain with a substance not deleterious to rubber, said blocks protruding very slightly from the inner circumference of the tread to receive the contact of the air spring. In this construction, these blocks perform an additional function of transmitting transversely of the tread member the radially outward pressure exerted by the air spring when expanded against such tread member, so as to prevent the otherwise existing tendency of such expansion to bend the tread member transversely, and particularly to bend the embedded metal sleeves, and thereby distort the link pivots out of their proper alinement. The pockets formed in the inner circumference of the tread member to receive these blocks, 12, are traversed at their bottoms by the embedded metal sleeves, 7; and the blocks are longitudinally grooved to adapt them to accommodate said embedded metal sleeves when the blocks are inserted in the pockets. This brings about an engagement of the blocks with the metal sleeves which tends to prevent any tendency which might otherwise arise of the blocks to be tipped in their pockets by the action of the air spring upon their inner surfaces. The length of the blocks is such as will leave adequate cushioning for their ends against any endwise movement,—that is, movement transversely of the tire,—which may sometimes result from the frictional engagement of the air spring with the blocks. The contour in transverse section of the tread member at its inner circumference from the ends of the blocks outward, is such that in radial section the inner surface of the tread member converges toward the surface of the ledges, 10, so that the tread member strikes the ledge first at the outer sides, the contact of the tread member with the ledge extending from the outer sides inward as compression proceeds. The inclination of the inner surface of the tread member with respect to the surface of the ledges operates to cause the direction of the compression resulting from the encounter of the tread member with the ledge to be toward the ends of the blocks, 12, instead of radially outward; and by this means the elastic resistance of approximately the entire body of the rubber situated inward from the metal sleeves, 7, is brought into service for cushioning the load before the limit of flattening of the endless chains is reached.

I claim:—

1. In a vehicle wheel, in combination with lateral guards forming between them a tire retaining channel, a tread member of cushioning material lodged in such channel and constructed for movement therein of its entire thickness toward and from the wheel axis under changes of load and draft links pivoted at one end to the guards and at the other end to the tread member and having their pivotal movement relatively to the tread member in planes parallel to the wheel, and extending from the first mentioned pivots approximately tangentially with respect to the circle in which said pivots are situated about the wheel axis.

2. In a vehicle wheel, in combination with lateral guards, forming between them a tire-retaining channel; a tread member of cushioning material lodged in such channel; draft links at opposite sides of the tread member, each pivoted at one end to the lateral guard at that side, and at the other end to the tread member, and extending from the first mentioned pivot approximately tangentially with respect to the circumference of the circle about the wheel axis in which said pivot is situated; the corresponding links at opposite sides of the tread member having their pivots extending into said tread member and connected together, said draft links having means for engaging the lateral guards at their respective sides; whereby said links and their pivots constitute means for tying together the opposite lateral guards.

3. In a vehicle wheel, in combination with lateral guards at opposite sides of the tread, and forming between them a tire-retaining channel; a tread member of cushioning material lodged in such channel having embedded in it and extending transversely through it, a multiplicity of metal tubes or sleeves and draft links pivoted at one end to the lateral guards and having at the other end pivot spindles extending into and obtaining bearing in said sleeves.

4. In a vehicle wheel, in combination with lateral metal guards forming between them a tire-retaining channel, and having peripheral laterally in-turned flanges with radially in-turned lips forming circumferential grooves facing the axis of the wheel; a tread member of cushioning material lodged in said channel between the lateral guards; two series of draft links located between the guards at opposite sides of the tread member pivoted at one end therein, the respectively opposite draft links having their pivots in the tread member connected together therein, the other ends of said links being pivoted to the lateral guards respectively, said links having at the outer side lugs projecting radially outward adapted for engaging said inwardly-opening grooves of the lateral guards.

5. In a vehicle wheel, in combination with opposite lateral guards forming between them a tire-retaining channel, a tread member of cushioning material lodged in such channel and constructed for movement therein of its entire thickness toward and from the wheel axis under changes of load; an endless chain of links lodged laterally with respect to the tread member; the pivots which connect consecutive links being engaged with the tread member independently of any such engagement effected by means of the links, and draft means connecting the links with the lateral guards at the sides of the tread at which the links respectively are located.

6. In a vehicle wheel, in combination with lateral guards forming between them a tire-retaining channel, a tread member of cushioning material lodged in such channel and constructed for movement therein of its entire thickness toward and from the wheel axis under changes of load; two endless chains of links lodged at the opposite sides of the tread member, the pivots of the corresponding links of the two chains being extended through the tread member and thereby engaged with and connected together and draft means connecting said pivots with the lateral guards.

7. In a vehicle wheel, in combination with lateral guards forming between them a tire-retaining channel, a tread member of cushioning material lodged in such channel; metal sleeves embedded transversely in the tread member; endless chains of links lodged at opposite sides of the tread member; draft links in two series, one at each side of the tread member, having their pivots at one end connected with the lateral guards respectively, and spindles or stems forming their pivots at the other end journaled in said transversely embedded sleeves, said last mentioned pivots or stems constituting the pivots connecting the links of said chains, respectively.

8. In a vehicle wheel, a flexible tread member of elastic cushioning material, such as rubber; lateral guards between which such tread member is retained; two endless chains positioned at opposite sides of the tread member between the lateral guards, and having the pivots connecting their links engaged with the tread member, the lateral guards having shoulders facing the wheel axis and in a circle thereabout; means by which the pivots of the links of the chain are stopped by such shoulder when moving away from the wheel axis, the circle in which said encountering means are situated when disposed in a circle about the wheel axis, being of slightly less diameter than the circle defining the inwardly facing shoulder of the guard.

9. In a vehicle wheel, a flexible tread member of elastic cushioning material such as rubber; lateral guards between which such tread member is retained; endless chains composed of links positioned at opposite sides of the tread member between the lateral guards; metal sleeves embedded in the tread member with which the pivots of said endless chains are engaged, the lateral guards having each a circumferential shoulder facing toward the axis of the wheel at the inner side, encompassing the chains respectively, and means by which the pivots of the chain links are stopped by encounter with said shoulder to limit movement away from the axis; the diameter of the lateral guards at said circumferential shoulder being slightly more than the diameter of a circle circumscribing the chain when positioned with the link pivots in a circle.

10. In a vehicle wheel, in combination with a flexible tread member of elastic cushioning material such as rubber; lateral guards forming a channel in which said tread member is lodged; an air spring lodged in said channel within the tread member; anti-friction blocks lodged in the inner circumference of the tread member for seating upon the air spring; metal sleeves embedded transversely in the tread member, and means engaging said sleeves for connecting the tread member with the lateral guards, said embedded sleeves being positioned radially outward from the anti-friction blocks, respectively, and the blocks having at their inner sides each a groove for engagement with the embedded sleeve, whereby the blocks are prevented from being turned over in their seats in the rubber tread member.

11. In a vehicle wheel, in combination with a cushioning flexible and elastic tread member; lateral guards forming a channel between which the tread member is lodged; endless chains comprising links positioned at opposite sides of the tread member within the channel between the lateral guards, the link pivots of such chains being engaged with the tread member, the lateral guards having shoulders facing inwardly toward the axis of the wheel, overhanging the chains respectively, and dimensioned to limit the flattening of the chains under the load, and thereby limit the movement of the tread member radially inward with respect to the channel, said lateral guards having inwardly-extending ledges located normally inward from the inner circumference of the tread member a distance somewhat less than that involved in the flattening of the chains permitted by the relative dimensions of said chains and said peripheral shoulder of the lateral guards; whereby the inner circumferential portion of the tread member is compressed under the load after its lodgment upon said ledges before the limit of flattening of the chains is reached.

In testimony whereof, I have hereunto set my hand at Chicago, Illinois, this 31st day of August, 1914.

CHARLES S. BURTON.

Witnesses:
LUCY I. STONE,
EDNA M. MACINTOSH.

Copies of this patent may be obtained for five cents each, by addressing the "Commissioner of Patents, Washington. D. C."